(12) United States Patent
O'Shaughnessy et al.

(10) Patent No.: US 11,096,521 B2
(45) Date of Patent: Aug. 24, 2021

(54) SIDE CART LOCKING MECHANISM

(71) Applicant: OHC IP Holdings, LLC, Eden Prairie, MN (US)

(72) Inventors: Michael L. O'Shaughnessy, Edina, MN (US); James A. Mitlyng, Minneapolis, MN (US); Thomas E. McKinney, II, Minnetonka, MN (US)

(73) Assignee: OHC IP Holdings, LLC, Eden Prairie, MN (US)

( * ) Notice: Subject to any disclaimer, the term of this patent is extended or adjusted under 35 U.S.C. 154(b) by 103 days.

(21) Appl. No.: 16/450,510

(22) Filed: Jun. 24, 2019

(65) Prior Publication Data

US 2020/0000280 A1    Jan. 2, 2020

Related U.S. Application Data

(60) Provisional application No. 62/690,700, filed on Jun. 27, 2018.

(51) Int. Cl.
*A47J 37/07* (2006.01)

(52) U.S. Cl.
CPC ....... *A47J 37/0713* (2013.01); *A47J 37/0786* (2013.01); *A47J 2037/0777* (2013.01)

(58) Field of Classification Search
CPC .................. A47J 2037/0777; A47J 37/0786
See application file for complete search history.

(56) References Cited

U.S. PATENT DOCUMENTS

| | | | |
|---|---|---|---|
| 3,802,413 A | | 4/1974 | Pepin |
| 4,211,206 A | | 7/1980 | Darbo |
| 4,569,327 A | | 2/1986 | Velten |
| 4,577,772 A | * | 3/1986 | Bigliardi .............. B65D 88/121 220/1.5 |

(Continued)

FOREIGN PATENT DOCUMENTS

| | | |
|---|---|---|
| CN | 201005546 | 1/2008 |
| CN | 202801180 | 3/2013 |

(Continued)

OTHER PUBLICATIONS

"Brown Jordan Outdoor Kitchens," by Danver Stainless Outdoor Kitchens information booklet, Apr. 2018 (28 pages).

(Continued)

*Primary Examiner* — David J Laux
(74) *Attorney, Agent, or Firm* — Pauly, DeVries Smith & Deffner LLC

(57) ABSTRACT

In an embodiment, a grill system is provided. The grill system can include a grill assembly and a side assembly. The grill assembly can include a grill cart and a burner box coupled to a top portion of the grill cart. The side assembly is coupled to the grill assembly. The side assembly can include a side cart. The side cart includes a vertical support member and a slidable locking member disposed on the vertical support member. The side cart is transitionable between a folded state and an upright state. The slidable locking member is configured to slide along the vertical support member when the side cart is transitioned between the folded state and the upright state. The slidable locking member is further configured to lock the side cart into the upright state. Other embodiments are also included herein.

18 Claims, 15 Drawing Sheets

(56) References Cited

U.S. PATENT DOCUMENTS

| | | | |
|---|---|---|---|
| 4,887,836 A | 12/1989 | Simjian | |
| 4,949,701 A | 8/1990 | Krosp et al. | |
| 4,984,515 A | 1/1991 | Pivonka | |
| 5,040,809 A | 8/1991 | Yang | |
| 5,050,731 A | 9/1991 | Baynes et al. | |
| 5,065,734 A | 11/1991 | Elliott | |
| 5,261,550 A | 11/1993 | Karpisek | |
| 5,318,322 A * | 6/1994 | Home | A47J 37/0713 126/9 R |
| 5,462,318 A | 10/1995 | Cooke | |
| 5,579,755 A | 12/1996 | Johnston | |
| 5,884,554 A | 3/1999 | Sprick | |
| 6,026,751 A * | 2/2000 | Tsai | A47B 3/00 108/115 |
| 6,039,039 A | 3/2000 | Pina, Jr. | |
| 6,316,837 B1 | 11/2001 | Song | |
| 6,401,953 B2 | 6/2002 | Kofod | |
| 6,439,111 B1 | 8/2002 | Lu | |
| 6,439,220 B1 | 8/2002 | Johnson | |
| 6,439,221 B1 | 8/2002 | Ward et al. | |
| 6,494,419 B2 | 12/2002 | Pai | |
| 6,532,951 B1 | 3/2003 | Sallie et al. | |
| 6,606,986 B2 | 8/2003 | Holland et al. | |
| 6,619,600 B1 * | 9/2003 | Johnson | A47J 37/0704 126/25 R |
| D485,467 S | 1/2004 | Pai | |
| D491,414 S | 6/2004 | Nichols et al. | |
| 6,792,880 B2 * | 9/2004 | Tsai | A47B 3/00 108/115 |
| 6,823,858 B1 | 11/2004 | Chen | |
| 6,916,028 B2 | 7/2005 | Shapiro | |
| 7,080,640 B2 * | 7/2006 | Sanders | A47J 33/00 126/30 |
| D533,011 S | 12/2006 | Pai | |
| D541,576 S | 5/2007 | Lutz | |
| D546,616 S | 7/2007 | Tseng | |
| D546,624 S | 7/2007 | Pai | |
| D547,108 S | 7/2007 | Tseng | |
| D547,109 S | 7/2007 | Tseng | |
| D549,035 S | 8/2007 | Chung | |
| 7,360,783 B2 | 4/2008 | Home | |
| D615,799 S | 5/2010 | Best et al. | |
| D618,951 S | 7/2010 | Tzeng | |
| 7,753,047 B1 | 7/2010 | Trammell | |
| 7,856,924 B1 * | 12/2010 | Stihi | A47J 37/0731 99/419 |
| 8,042,829 B2 * | 10/2011 | Hailston | B62B 3/022 280/655.1 |
| 8,316,837 B2 | 11/2012 | Malumyan | |
| 8,347,874 B2 | 1/2013 | Bruno et al. | |
| 8,479,928 B2 * | 7/2013 | Tanabe | A63B 71/0045 211/64 |
| 8,522,769 B2 * | 9/2013 | Ducate, Jr. | A47J 37/0786 126/25 R |
| 8,602,017 B2 * | 12/2013 | May | A47J 37/0704 126/9 R |
| RE44,770 E | 2/2014 | Nichols et al. | |
| 8,839,780 B1 * | 9/2014 | Bennett | G05B 19/41815 126/25 R |
| D737,096 S | 8/2015 | Lee et al. | |
| 9,187,108 B2 | 11/2015 | Bruno et al. | |
| 9,211,036 B2 | 12/2015 | May et al. | |
| 9,316,401 B1 | 4/2016 | Guste | |
| 9,392,904 B2 * | 7/2016 | Garman | A47J 37/0763 |
| D798,645 S | 10/2017 | Lira-Nunez et al. | |
| 9,783,216 B2 * | 10/2017 | Alden | B62B 1/12 |
| 9,788,690 B2 * | 10/2017 | Rosian | A47J 37/0786 |
| 9,817,108 B2 | 11/2017 | Kuo et al. | |
| D805,332 S | 12/2017 | Price et al. | |
| D805,819 S | 12/2017 | Price et al. | |
| D820,010 S | 6/2018 | Reyes | |
| 10,689,018 B2 | 6/2020 | Patton et al. | |
| 10,702,099 B2 * | 7/2020 | O'Shaughnessy | A47J 37/0713 |
| 10,772,466 B2 * | 9/2020 | O'Shaughnessy | A47J 37/0786 |
| D899,176 S | 10/2020 | Lien | |
| 10,966,569 B2 | 4/2021 | O'Shaughnessy et al. | |
| 11,033,147 B2 | 6/2021 | O'Shaughnessy et al. | |
| 11,045,049 B2 | 6/2021 | O'Shaughnessy et al. | |
| D923,996 S | 7/2021 | O'Shaughnessy et al. | |
| D924,002 S | 7/2021 | O'Shaughnessy et al. | |
| 2001/0015137 A1 | 8/2001 | Ogrady et al. | |
| 2004/0020482 A1 | 2/2004 | Chen | |
| 2004/0065313 A1 | 4/2004 | Thompson | |
| 2006/0049725 A1 * | 3/2006 | Simon | A47B 77/02 312/111 |
| 2006/0225725 A1 | 10/2006 | Rinaldo | |
| 2007/0089724 A1 * | 4/2007 | Home | A47J 37/0704 126/9 R |
| 2007/0152414 A1 | 7/2007 | Home | |
| 2008/0066730 A1 | 3/2008 | Ducate | |
| 2008/0245357 A1 * | 10/2008 | Meether | A47J 37/0786 126/25 R |
| 2010/0031950 A1 | 2/2010 | Paslawski | |
| 2010/0269814 A1 * | 10/2010 | May | A47J 37/0704 126/25 R |
| 2010/0326938 A1 * | 12/2010 | Zhu | A47F 5/10 211/149 |
| 2011/0025005 A1 | 2/2011 | Howell | |
| 2011/0041831 A1 | 2/2011 | Dettloff | |
| 2011/0168155 A1 | 7/2011 | Gallo | |
| 2011/0168168 A1 | 7/2011 | Schneider | |
| 2011/0168593 A1 | 7/2011 | Neufeld et al. | |
| 2012/0012091 A1 | 1/2012 | Home | |
| 2012/0017890 A1 * | 1/2012 | May | A47J 37/0704 126/9 R |
| 2013/0049311 A1 | 2/2013 | Metters et al. | |
| 2013/0112088 A1 | 5/2013 | May | |
| 2013/0312732 A1 * | 11/2013 | Brennan | A47J 37/0713 126/25 R |
| 2014/0069412 A1 | 3/2014 | Garman | |
| 2014/0090635 A1 | 4/2014 | May | |
| 2014/0165992 A1 | 6/2014 | May et al. | |
| 2014/0261394 A1 | 9/2014 | Evans et al. | |
| 2015/0013667 A1 | 1/2015 | Ho et al. | |
| 2015/0020796 A1 * | 1/2015 | Garman | A47J 37/0704 126/9 B |
| 2015/0118006 A1 | 4/2015 | Wallace-riley | |
| 2016/0305172 A1 | 10/2016 | Grisendi | |
| 2017/0085114 A1 | 3/2017 | Gao et al. | |
| 2017/0095114 A1 | 4/2017 | O'shaughnessy et al. | |
| 2017/0143162 A1 * | 5/2017 | Olsen | A47J 37/07 |
| 2017/0159941 A1 | 6/2017 | Kahler et al. | |
| 2018/0008095 A1 * | 1/2018 | Bennett | A47J 37/0786 |
| 2018/0132660 A1 * | 5/2018 | Suchevits | A23B 4/052 |
| 2018/0141576 A1 * | 5/2018 | Leffler | B62B 5/0063 |
| 2018/0280677 A1 | 10/2018 | Knight | |
| 2018/0290677 A1 | 10/2018 | Patton et al. | |
| 2018/0310765 A1 * | 11/2018 | May | A47J 37/0704 |
| 2019/0380533 A1 | 12/2019 | Lien | |
| 2020/0000277 A1 | 1/2020 | O'Shaughnessy et al. | |
| 2020/0000278 A1 | 1/2020 | O'Shaughnessy et al. | |
| 2020/0000279 A1 | 1/2020 | O'Shaughnessy et al. | |
| 2020/0000281 A1 | 1/2020 | O'Shaughnessy et al. | |
| 2020/0000283 A1 | 1/2020 | O'Shaughnessy et al. | |
| 2020/0390279 A1 | 12/2020 | O'Shaughnessy et al. | |
| 2020/0391779 A1 | 12/2020 | Patton et al. | |
| 2021/0045579 A1 | 2/2021 | O'Shaughnessy et al. | |

FOREIGN PATENT DOCUMENTS

| | | |
|---|---|---|
| CN | 202807780 | 3/2013 |
| CN | 104234616 | 12/2014 |
| CN | 204618011 | 9/2015 |
| CN | 205632566 | 10/2016 |
| CN | 107198467 | 9/2017 |
| CN | 211685163 | 10/2020 |
| JP | 2006223643 | 8/2006 |
| KR | 200173343 | 4/2000 |
| KR | 20050102437 | 10/2005 |
| KR | 20130000879 | 2/2013 |
| TW | 309958 | 7/1997 |
| WO | 2004054415 | 7/2004 |

(56) References Cited

FOREIGN PATENT DOCUMENTS

| WO | 2004072539 | 8/2004 |
| WO | 2015089551 | 6/2015 |
| WO | 2016149408 | 11/2016 |
| WO | 2017095746 | 6/2017 |
| WO | 2017160338 | 9/2017 |
| WO | 2018183373 | 10/2018 |
| WO | 2020005946 | 1/2020 |
| WO | 2020005969 | 1/2020 |
| WO | 2020005972 | 1/2020 |
| WO | 2020005976 | 1/2020 |
| WO | 2020005978 | 1/2020 |
| WO | 2020005981 | 1/2020 |

OTHER PUBLICATIONS

Colon, Linda M. "Danver's Post and Panel System is a Hit with Architects, Builders, Developers & Designers," Danver Outdoor Kitchens Jun. 1, 2018 (2 pages).
File History for U.S. Appl. No. 15/262,733 downloaded Aug. 23, 2019 (326 pages).
File History for U.S. Appl. No. 15/937,666 downloaded Aug. 23, 2019 (201 pages).
"First Office Action," for Chinese Patent Application No. 20110876505.3 dated Dec. 18, 2018 (14 pages) with English Translation.
"International Preliminary Report on Patentability," for PCT Application No. PCT/US2016/051319 dated Sep. 27, 2018 (11 pages).
"International Search Report and Written Opinion," for PCT Application No. PCT/US2016/051319 dated Dec. 8, 2016 (14 pages).
"International Search Report and Written Opinion," for PCT Application No. PCT/US2018/024628 dated Jul. 11, 2018 (16 pages).
"Modular Outdoor Kitchen," Char-Broil Medallion Series Outdoor Kitchen information retrieved from https://www.charbroil.com/grills/modular-outdoor-kitchen on Aug. 8, 2019 (4 pages).
"Origami Kitchen Island Cart with Wheels," Description and Product Specs at least as early as Aug. 9, 2019 (5 pages).
"Traeger Wood Pellet Grills," Product Listing found on www.traegergrills.com at least as early as Aug. 9, 2019 (4 pages).
"Final Office Action," for U.S. Appl. No. 16/450,541 dated Feb. 5, 2020 (19 pages).
"Non-Final Office Action," for U.S. Appl. No. 15/262,733 dated Jan. 8, 2020 (18 pages).
"Notice of Allowance," for U.S. Appl. No. 15/937,666 dated Feb. 18, 2020 (14 pages).
"Notice of Allowance," for U.S. Appl. No. 16/450,303 dated Feb. 14, 2020 (13 pages).
"Notice of Allowance," for U.S. Appl. No. 16/450,541 dated May 14, 2020 (12 pages).
"Response to Final Office Action," for U.S. Appl. No. 16/450,541, filed May 5, 2020 (7 pages).
"Response to Non Final Office Action," for U.S. Appl. No. 16/450,541, filed Dec. 30, 2019 (16 pages).
"Third Office Action," for Chinese Patent Application No. 201610876505.3 dated Mar. 19, 2020 (8 pages) with English Translation.
"Char-Broil Modular Outdoor Kitchen," Char Broil webpage Apr. 29, 2019, retrieved on Aug. 8, 2019, https://www.charbroil.com/grills/outdoor-kitchens/modular-outdoor-kitchen (4 pages).
"Danver's Post and Panel System," Danver webpage Jun. 1, 2018, retrieved on Aug. 8, 2019, https://danver.com/blog/post-and-panel-system/ (2 pages).
"Final Office Action," for U.S. Appl. No. 15/262,733 dated Sep. 5, 2019 (14 pages).
"International Preliminary Report on Patentability," for PCT Application No. PCT/US2018/024628 dated Oct. 10, 2019 (13 pages).
"International Search Report and Written Opinion," for PCT Application No. PCT/US2019/038993 dated Oct. 15, 2019 (13 pages).
"International Search Report and Written Opinion," for PCT Application No. PCT/US2019/039024 dated Oct. 15, 2019 (14 pages).
"International Search Report and Written Opinion," for PCT Application No. PCT/US2019/039027 dated Oct. 15, 2019 (13 pages).
"International Search Report and Written Opinion," for PCT Application No. PCT/US2019/039034 dated Oct. 15, 2019 (12 pages).
"International Search Report and Written Opinion," for PCT Application No. PCT/US2019/039039 dated Oct. 16, 2019 (14 pages).
"International Search Report and Written Opinion," for PCT Application No. PCT/US2019/039042 dated Oct. 16, 2019 (13 pages).
"Non-Final Office Action," for U.S. Appl. No. 16/450,303 dated Oct. 24, 2019 (19 pages).
"Non-Final Office Action," for U.S. Appl. No. 16/450,541 dated Oct. 1, 2019 (21 pages).
"Origami Carts and Racks," Origami webpage Apr. 20, 2016, retrieved on Dec. 9, 2019 via web.archive.org, https://origamirack.com (12 pages).
"Response to Final Office Action," for U.S. Appl. No. 15/262,733, filed Dec. 5, 2019 (11 pages).
"Second Office Action," for Chinese Patent Application No. 201610876505.3 dated Aug. 29, 2019 (4 pages) with English Translation.
"Sunco Outdoor Kitchen," Mar. 16, 2018 URL <https://www.sunco.com.au/shop/bbqs/sc100-xspec-four-burner-outdoor-kitchen/> (3 pages).
"Traeger Wood Pellet Grills," Traeger Grills webpage Apr. 7, 2006, retrieved on Dec. 9, 2019 via web.archive.org, https://www.traegergrills.com (2 pages).
"Ex Parte Quayle Action," for U.S. Appl. No. 29/695,966, mailed Dec. 11, 2020 (23 pages).
"Ex Parte Quayle Action," for U.S. Appl. No. 29/695,973 mailed Dec. 11, 2020 (23 pages).
"Ex Parte Quayle Action," for U.S. Appl. No. 29/695,976 mailed Dec. 11, 2020 (24 pages).
"Fourth Office Action," for Chinese Patent Application No. 201610876505.3 dated Sep. 30, 2020 (11 pages) with English Summary.
Morgan, Grant "Nationwide Marketing Group Announces Its Partnership with Tytus Grills," first available online Oct. 9, 2019, TytusGrills.com, [online], [site visited Nov. 27, 2020], available from internet URL: https://www.twice.com/retailing/nationwide-marketing-group-announces-its-partnership-with-tytus-grills (year: 2019).
"Non-Final Office Action," for U.S. Appl. No. 16/450,356 dated Nov. 18, 2020 (31 pages).
"Non-Final Office Action," for U.S. Appl. No. 16/450,493 dated Nov. 2, 2020 (26 pages).
"Notice of Allowance," for U.S. Appl. No. 16/450,388 dated Dec. 1, 2020 (27 pages).
"Tytus Charcoal Grey Stainless Steel 4 Burner Free Standing Grill," first available 2020, TytusGrills.com, [online], [site visited Nov. 27, 2020], Available from internet URL: https://tytusgrills.com/collections/grills/products/tytus-charcoal-grey-stainless-steel-4- burner-free-standing-grill (Year: 2020), 5 pages.
"Tytus Grills," first available 2020, TytusGrills.com, [online], [site visited Dec. 1, 2020], Available from internet URL: https://tytusgrills.com/collections/grills (Year: 2020), 3 pages.
"Tytus TI404MGGLP Spec Sheet," first available 2020, AppliancesConnection.com, [online], [site visited Nov. 27, 2020], Available from internet URL: https://static.appliancesconnection.com/attachments/D5f524932e12f6.pdf (Year: 2020), 2 pages.
"Tytus TI400MWLP Spec Sheet," first available 2020, SamsClub.com, [online], [site visited Nov. 27, 2020], Available from internet URL: https://content.syndigo.com/asset/9f341 0f8-d6c3-48c1-a02c-f5bdbb9f989b/original.pdf (Year: 2020), 2 pages.
"Tytus TI400SSBLP341 Spec Sheet," first available 2020, AppliancesConnection.com, [online], [site visited Nov. 27, 2020], Available from internet URL: https://static.appliancesconnection.com/attachments/D5f524e4ae6c38.pdf (Year: 2020), 2 pages.
"Tytus User Manual 4-Burner Gas Grill and 4-Burner Island Gas Grill with Side Cabinets," first available 2020, TytusGrills.com, [online], [site visited Dec. 1, 2020], Available from internet URL: https://tytusgrills.com/pages/manualsanddocuments (Year: 2020), 60 pages).
"International Preliminary Report on Patentability," for PCT Application No. PCT/US2019/038993 dated Jan. 7, 2021 (9 pages).

(56) References Cited

OTHER PUBLICATIONS

"International Preliminary Report on Patentability," for PCT Application No. PCT/US2019/039024 dated Jan. 7, 2021 (10 pages).
"International Preliminary Report on Patentability," for PCT Application No. PCT/US2019/039027 dated Jan. 7, 2021 (9 pages).
"International Preliminary Report on Patentability," for PCT Application No. PCT/US2019/039034 dated Jan. 7, 2021 (8 pages).
"International Preliminary Report on Patentability," for PCT Application No. PCT/US2019/039039 dated Jan. 7, 2021 (10 pages).
"International Preliminary Report on Patentability," for PCT Application No. PCT/US2019/039042 dated Jan. 7, 2021 (9 pages).
"Notice of Allowance," for Design U.S. Appl. No. 29/695,976 dated Mar. 8, 2021 (16 pages).
"Notice of Allowance," for U.S. Appl. No. 16/450,356 dated Feb. 26, 2021 (17 pages).
"Notice of Allowance," for U.S. Appl. No. 16/450,493 dated Feb. 12, 2021 (21 pages).
"Notice of Allowance," for U.S. Appl. No. 29/695,966 dated Mar. 1, 2021 (14 pages).
"Notice of Allowance," for U.S. Appl. No. 29/695,973 dated Mar. 3, 2021 (16 pages).
"Response after Ex Parte Quayle Action," for U.S. Appl. No. 29/695,966, filed Feb. 9, 2021 (4 pages).
"Response after Ex Parte Quayle Action," for U.S. Appl. No. 29/695,973, filed Feb. 9, 2021 (4 pages).
"Response after Ex Parte Quayle Action," for U.S. Appl. No. 29/695,976, filed Feb. 9, 2021 (4 pages).
"Response to Non Final Office Action," for U.S. Appl. No. 16/450,356, filed Feb. 17, 2021 (11 pages).
"Response to Non Final Office Action," for U.S. Appl. No. 16/450,493, filed Feb. 2, 2021 (11 pages).
"Notice of Allowance," for U.S. Appl. No. 29/695,969 dated Mar. 24, 2021 (18 pages).
"Office Action," for Chinese Patent Application No. 202022193760.2 dated Apr. 19, 2021 (4 pages) with English Translation.

* cited by examiner

SIDE CART LOCKING MECHANISM

CLAIM OF PRIORITY

This application claims the benefit of U.S. Provisional Application No. 62/690,700, filed Jun. 27, 2018, the content of which is herein incorporated by reference in its entirety.

REFERENCE TO RELATED APPLICATIONS

The following five nonprovisional applications also claim priority to U.S. Provisional Application No. 62/690,700, are co-owned, and are filed on the event date herewith: U.S. application Ser. No. 16/450,303, titled, "Grill and Side Cart Attachment Systems and Methods,"; U.S. application Ser. No. 16/450,356, titled, "Securing of Panels to Grill System,"; U.S. application Ser. No. 16/450,388, titled, "Grill System with Decorative Panels,"; U.S. application Ser. No. 16/450,493, titled, "Gas Guard in Grill Cart,"; and U.S. application Ser. No. 16/450,541, titled, "Grill Assembly with Foldable Cart,"; the contents of which for each application are herein incorporated by reference in their entirety. The following four design applications are co-owned and are filed on the event date herewith: U.S. Design application No. 29/695,966, titled, "Grill System,"; U.S. Design application Ser. No. 29/695,969, titled, "Grill Assembly,"; U.S. Design application Ser. No. 29/695,973, titled, "Grill Cart,"; U.S. Design application Ser. No. 29/695,976, titled, "Side Assembly,"; the contents of which for each application are herein incorporated by reference in their entirety.

FIELD

The present application relates to grills and outdoor cooking systems. More specifically, the present application relates to easily assembled grills and outdoor cooking systems.

BACKGROUND

Grilling is a cooking style that is especially popular in the United States. Grills are frequently not particularly portable or easy to set up. In many cases, grills are difficult to assemble due to numerous steps requiring the user to construct a frame with numerous components.

Attempts have been made to design grills that are easy to assemble after unloading from shipping containers. However, in many past systems, grill systems include a large number of pieces, require numerous steps to assemble, and some assembly steps require tools.

Some past systems mount a firebox on a foldable stand. However, the foldable stands can require complex set-up steps and, even in the folded configuration, some of the foldable stands take-up significant space.

Permanent outdoor grill installations are increasingly popular, and allow consumers to choose many finishes and options to create an attractive and functional outdoor kitchen environment. These installations are very expensive, and lack the flexibility of a moveable grill system.

SUMMARY

In an embodiment, a grill system is provided. The grill system can include a grill assembly and a side assembly. The grill assembly can include a grill cart and a burner box coupled to a top portion of the grill cart. The side assembly is coupled to the grill assembly. The side assembly can include a side cart. The side cart includes: a front frame; a back frame; a bottom frame; a top frame; a vertical support member extending between the top frame and the bottom frame; and a slidable locking member disposed on the vertical support member. The side cart is transitionable between a folded state and an upright state. The side cart defines an interior volume. The interior volume is greater when the side cart is in the upright state than when the side cart is in the folded state. The bottom frame is coupled to the front frame and the back frame. The top frame is coupled to the front frame and the back frame. The top frame is disposed above the bottom frame. The slidable locking member is configured to slide along the vertical support member when the side cart is transitioned between the folded state and the upright state. The slidable locking member is further configured to lock the side cart into the upright state.

In an embodiment, the top frame is substantially parallel with the bottom frame when the side cart is in the upright state.

In an embodiment, the top frame includes a first half and a second half, the first half being rotatably coupled to the second half.

In an embodiment, the first half of the top frame is rotatably coupled to the front frame and the second half of the top frame is rotatably coupled to the back frame. In an embodiment, the bottom frame includes a first half and a second half, the first half is rotatably coupled to the second half. The first half of the bottom frame is rotatably coupled to the front frame and the second half of the bottom frame is rotatably coupled to the back frame.

In an embodiment, when the side cart is in the folded state, the first half of the bottom frame is located in the same plane as the first half of the top frame.

In an embodiment, the slidable locking member includes a locking pin, and the vertical support member defines at least one locking pin aperture configured to receive a portion of the locking pin when the side cart is in an upright state to lock the side cart in the upright state and prevent the side cart from transitioning into the folded state.

In an embodiment, the locking pin is spring biased into a locked state.

In an embodiment, the front frame includes a door or a drawer.

In an embodiment, the side cart further includes a first arm extending from the front frame to the slidable locking member and a second arm extending from the back frame to the slidable locking member. The slidable locking member is configured to move towards the bottom frame as the side cart is transitioned from the folded state to the upright state.

In an embodiment, the side cart further includes a first arm extending from the front frame to the slidable locking member and a second arm extending from the back frame to the slidable locking member. The slidable locking member is configured to move towards the top frame as the side cart is transitioned from the folded state to the upright state.

In an embodiment, a method of assembling a grill system is provided. The method can include aligning a burner box with a top portion of a grill cart; coupling the burner box to the grill cart to form a grill assembly; transitioning a side cart from a folded state to an upright state; locking the side cart into the upright state; and coupling the side cart to the grill assembly. The side cart includes: a front frame, a back frame, a bottom frame; a top frame, a vertical support member extending from the bottom frame to the top frame, and a slidable locking member disposed on the vertical support member. The side cart defines an interior volume.

The interior volume is greater when the side cart is in the upright state than when the side cart is in the folded state. The bottom frame is coupled to the front frame and the back frame. The top frame is coupled to the front frame and the back frame. The top frame is disposed above the bottom frame. The slidable locking member is configured to slide along the vertical support member when the side cart is transitioned between the folded state and the upright state. The slidable locking member is further configured to lock the side cart into the upright state.

In an embodiment, the slidable locking member includes a locking pin and the vertical support member defines a locking pin aperture.

In an embodiment, locking the side cart in the upright state includes inserting the locking pin into the locking pin aperture.

In an embodiment, the method can further include: unlocking the side cart from the upright state by removing the locking pin from the locking pin aperture.

In an embodiment, the method can further include: transitioning the side cart into the folded state.

In an embodiment, the side cart further includes a first arm extending from the front frame to the slidable locking member and a second arm extending from the back frame to the slidable locking member. The slidable locking member is configured to move towards the bottom frame as the side cart is transitioned from the folded state to the upright state.

In an embodiment, the side cart further includes a first arm extending from the front frame to the slidable locking member and a second arm extending from the back frame to the slidable locking member. The slidable locking member is configured to move towards the top frame as the side cart is transitioned from the folded state to the upright state.

In an embodiment, a grill system is provided. The grill system can include a grill assembly and a side assembly. The grill assembly can include a grill cart and a burner box coupled to a top portion of the grill cart. The side assembly can be coupled to the grill assembly. The side assembly can include a side cart. The side cart includes: a front frame; a back frame; a bottom frame; a top frame; a vertical support member extending between the top frame and the bottom frame; and a slidable locking member disposed on the vertical support member. The side cart is transitionable between a folded state and an upright state. The side cart defines an interior volume. The interior volume is greater when the side cart is in the upright state than when the side cart is in the folded state. The bottom frame is coupled to the front frame and the back frame. The top frame is coupled to the front frame and the back frame. The top frame is disposed above the bottom frame. The slidable locking member is configured to slide along the vertical support member when the side cart is transitioned between the folded state and the upright state. The slidable locking member is further configured to lock the side cart into the upright state. The slidable locking member includes a locking pin. The vertical support member defines at least one locking pin aperture configured to receive a portion of the locking pin when the side cart is in an upright state to prevent the side cart from transitioning into the folded state. The side cart further includes a first arm extending from the front frame to the slidable locking member and a second arm extending from the back frame to the slidable locking member.

In an embodiment, the locking pin is spring biased into a locked state.

In an embodiment, a grill system is provided. The grill system can include a grill assembly and a side assembly. The grill assembly can include a grill cart and a burner box coupled to a top portion of the grill cart. The side assembly can be coupled to the grill assembly. The side assembly can include a side cart. The side cart includes: a slidable locking member disposed on a vertical support member; and a panel disposed between a front frame and a back frame in the upright state. The side cart is transitionable between a folded state and an upright state. The side cart defines an interior volume. The interior volume is greater when the side cart is in the upright state than when the side cart is in the folded state. The slidable locking member is configured to slide along the vertical support member when the side cart is transitioned between the folded state and the upright state. The slidable locking member is further configured to lock the side cart into the upright state. The slidable locking member includes a locking pin, and the vertical support member defines at least one locking pin aperture configured to receive a portion of the locking pin when the side cart is in an upright state to prevent the side cart from transitioning into the folded state. The panel is configured to provide a secondary locking function to the side cart in the upright state.

In an embodiment, the panel provides the secondary locking function to the side cart in the upright state by preventing the front frame and the back frame from moving toward each other when the panel is attached to the side assembly.

In an embodiment, the panel provides the secondary locking function to the side cart in the upright state by interfering with the locking pin when the locking pin attempts to withdraw from the locking pin aperture.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Described below and shown in the figures are various embodiments of components that can be included in a grill system. In many examples, the grill systems described herein can provide a highly customizable, an easily assembled, and an easily installed outdoor kitchen environment.

The grill system can include a grill assembly and one or more side assemblies. The grill assembly can include a burner box, which can be used to cook foods, such as meats and vegetables. Each side assembly can include a functional top cap to provide additional functionality to the grill system.

The grill and side assemblies can be shipped or transported in a folded configuration. In the folded configuration, the grill and side assemblies can have a smaller volume compared to the upright configurations. The smaller volume can reduce the cost and difficulty of storing and transporting the components. In various embodiments, a locking member can lock the side cart or grill cart into the upright configuration.

The grill and side assemblies described herein can be easily assembled. In many cases, the grill and side assemblies can be assembled by a single user or only two users. In many examples, the grill and side assemblies can be assembled without the use of tools. In many examples, the grill and side assemblies can be assembled quickly, such as in less than three minutes for each component.

Grill System with Grill Assembly and Side Assemblies

Figure 1:
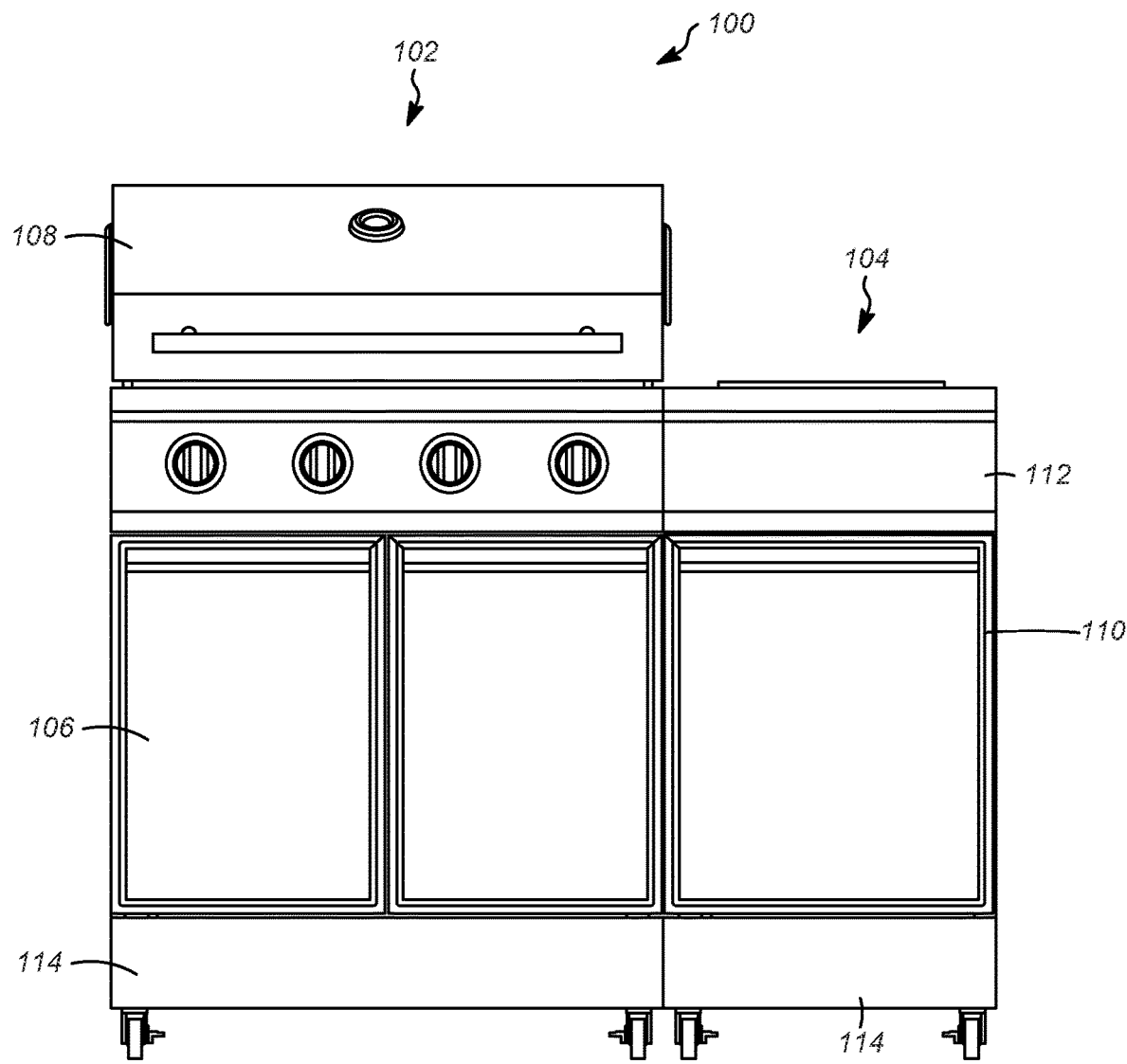
FIG. 1 is a front view of a grill system in accordance with various embodiments herein.

The figures show various views and embodiments of grill systems and components. FIG. 1 shows a grill system 100 including a grill assembly 102 and a side assembly 104. The grill assembly 102 can include a grill cart 106 and a burner box 108 (also referred to as a "firebox") coupled to a top portion of the grill cart 106. The side assembly 104 can include a side cart 110 and a top cap 112. The top cap 112 can be coupled to a top portion of the side cart 110.

Figure 2:
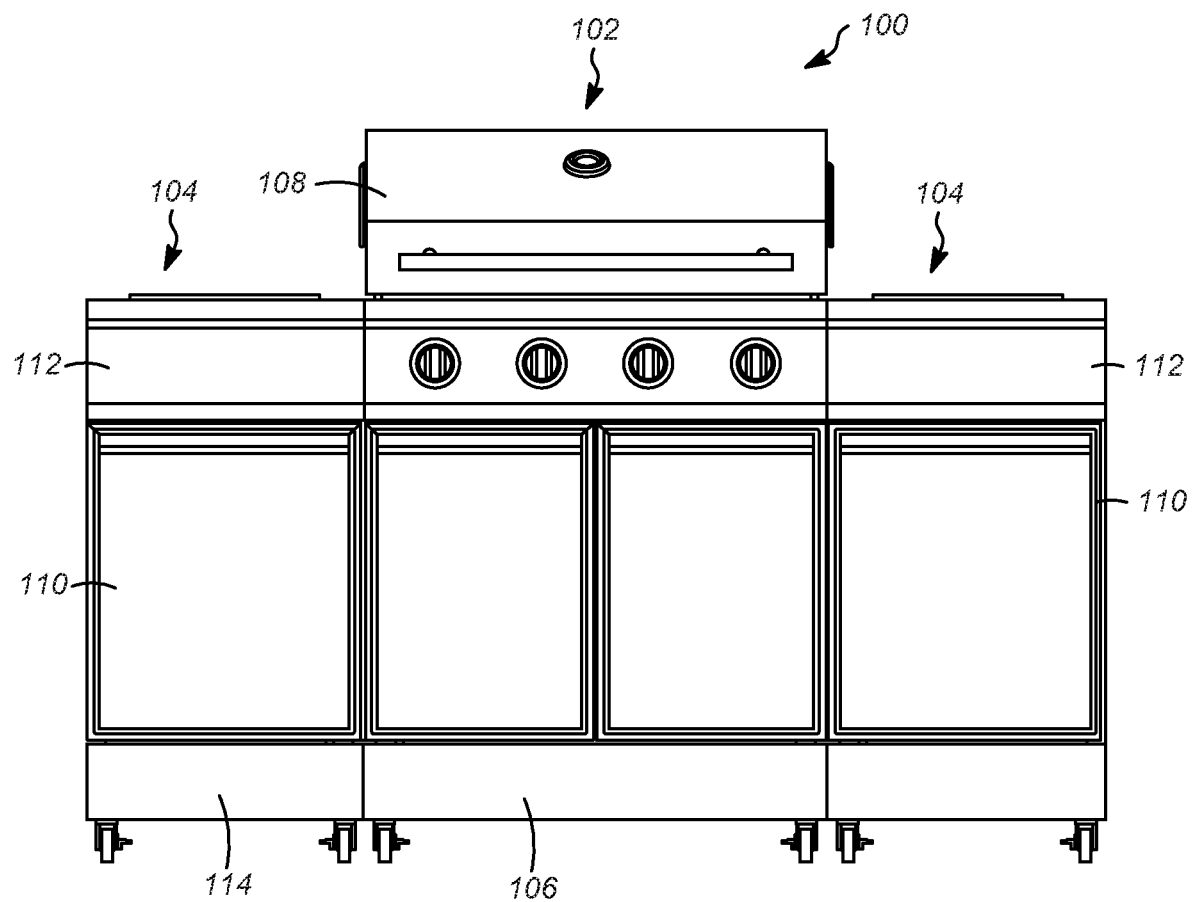
FIG. 2 is a front view of a grill system in accordance with various embodiments herein.

FIG. 2 shows a front view of a grill system 100 in accordance with various embodiments herein. In some embodiments, the grill system 100 can include a grill assembly 102, and two or more side assemblies 104. Each of the side assemblies 104 can include a side cart 110 and a top cap 112. In some embodiments, the side assemblies 104 can be disposed on opposite sides of the grill assembly 102, such as shown in FIG. 2. In some embodiments, the side assemblies 104 can be disposed on the same side of the grill assembly 102. In other embodiments, the grill system 100 can include additional side assemblies 104, such as three, four, five, six, or more side assemblies 104.

In some embodiments, an equal number of side assemblies 104 can be located on either side of the grill assembly 102. In some embodiments, the number of side assemblies 104 on one side of the grill assembly 102 can be greater than or less than the number of side assemblies 104 on the other side of the grill assembly 102.

In various embodiments, the burner box 108 can include a first connection structure, and the top cap 112 can include a second connection structure. The first connection structure can be configured to mate with the second connection structure to couple the grill assembly 102 to the side assembly 104.

In some embodiments, the grill assembly 102 can include a toe kick panel 114. In some embodiments, the side assembly 104 can include a toe kick panel 114. In some embodiments, the toe kick panel 114 of the grill assembly 102 can include a connection feature and the toe kick panel 114 of the side assembly 104 can include a connection feature, such as two portions of a latch mechanism. The connection features of the two toe kick panels 114 can be coupled together to couple the grill assembly 102 with the side assembly 104.

In some embodiments, the grill cart 106 can include one or more panels on the sides of the grill cart 106. In some embodiments, the grill cart 106 can include a toe kick panel 114. In some embodiments, the toe kick panel 114 and the panel can include a common decorative design to provide a cohesive appearance.

Side Assembly

Figure 3:
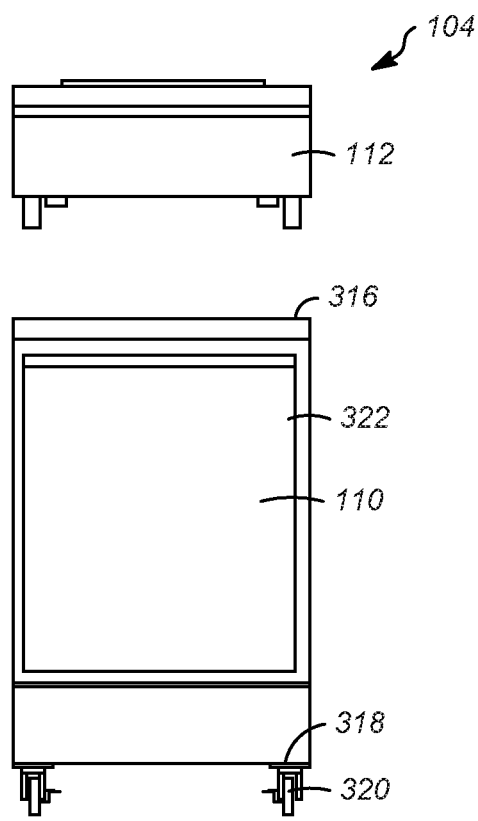
FIG. 3 is an exploded front view of a side assembly in accordance with various embodiments herein.

In reference now to FIG. 3, a partially exploded front view of a side assembly 104 is shown in accordance with various embodiments herein. The side assembly 104 can include a top cap 112 coupled to a top portion of a side cart 110.

Top Cap

In various embodiments, the top cap 112 can include a functional element. In some embodiments, the functional element can include one of the following: a second burner box, an ice box, a smoker, an oven, a sink, a work surface, a warming drawer, a sous vide cooker, a high heat burner, a ceramic cooker, a pellet grill, a portion of a pellet grill (such as a pellet feeder or a pellet hopper), or a refrigerator. In some embodiments of a grill system 100 with two or more side assemblies 104, each of the top caps 112 can include a different functional element. In some embodiments of a grill system 100 with two or more side assemblies 104, at least two of the functional elements can be the same. In some embodiments of a grill system 100 with two or more side assemblies 104, at least two of the functional elements can be different.

Side Cart

The side cart 110 can provide a support or a stand for the top cap 112. The side cart 110 can include a bottom portion 318 and a top portion 316 (shown in FIG. 3). The top cap 112 can be coupled to the top portion 316 of the side cart 110. In some embodiments, the bottom portion 318 can include wheels 320, or casters, such as to provide easy portability for the side assembly 104. In some embodiments, the wheels 320 can include a brake or lock to prevent the wheels from rotating thereby preventing the cart from moving. In various embodiments, the bottom portion 318 can include adjustable leveling feet or adjustable leveling wheels to allow a user to adjust the height of the feet or wheels, such as to accommodate for uneven surfaces, which can be common in outdoor applications.

In some embodiments, the side cart 110 can include one or more doors 322. The door 322 can provide access to the interior of the side cart 110. In some embodiments, the interior of the side cart 110 can be configured to house or store other grill or cooking related equipment, such as tongs, spatulas, or brushes. In some embodiments, the side cart 110 can include one or more drawers. A drawer can be disposed within the interior volume of the side cart 110 and can be accessed by a user from the front of the side cart 110, similar to the door 322 shown in FIG. 3.

Figure 6:
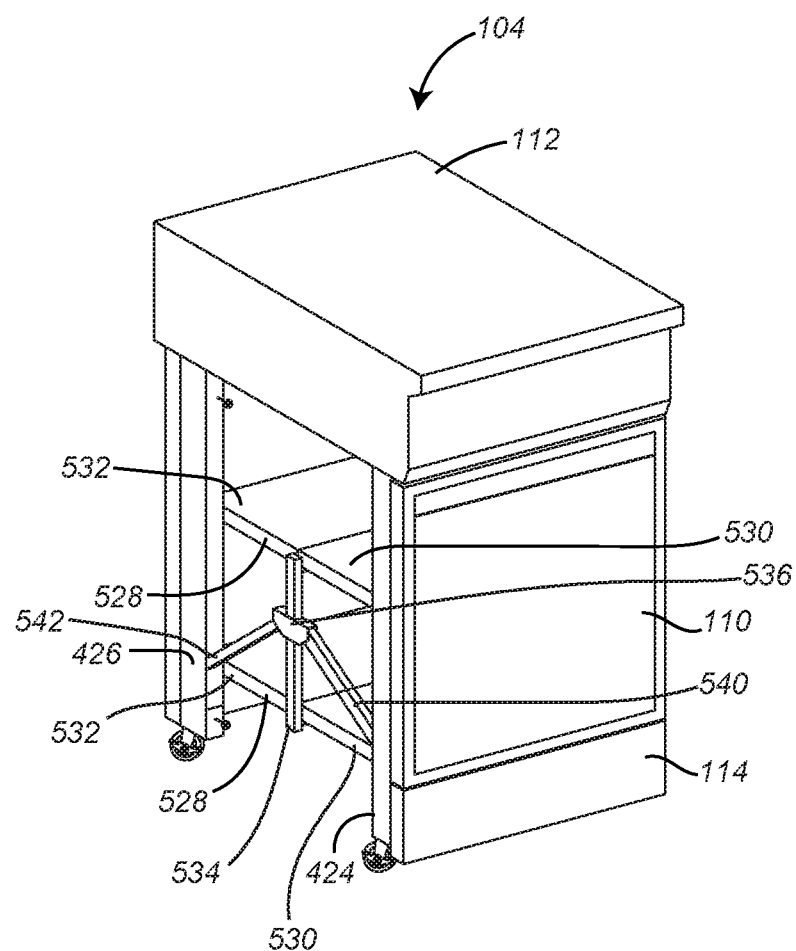
FIG. 6 is a perspective view of the side cart of FIG. 4 in the side assembly of FIG. 3 in an upright state in accordance with various embodiments herein.

The side cart 110 can be transitionable between a folded state (shown in FIG. 4) and an upright state (shown in FIG. 6). The side cart 110 can define an interior volume. The interior volume can be greater when the side cart 110 is in the upright state compared to when the side cart 110 is in the folded state.

In some embodiments, the interior volume of the side cart 110 in the folded state can be less than 50% of the interior volume of the side cart 110 in the upright state. In some embodiments, the interior volume of the side cart 110 in the folded state can be less than 40% of the interior volume of the side cart 110 in the upright state. In some embodiments, the interior volume of the side cart 110 in the folded state can be less than 30% of the interior volume of the side cart 110 in the upright state. In some embodiments, the interior volume of the side cart 110 in the folded state can be less than 25% of the interior volume of the side cart 110 in the upright state. In some embodiments, the interior volume of the side cart 110 in the folded state can be less than 20% of the interior volume of the side cart 110 in the upright state. In some embodiments, the interior volume of the side cart 110 in the folded state can be less than 15% of the interior volume of the side cart 110 in the upright state. In some embodiments, the interior volume of the side cart 110 in the folded state can be less than 10% of the interior volume of the side cart 110 in the upright state. In some embodiments, the interior volume of the side cart 110 in the folded state can be less than 5% of the interior volume of the side cart 110 in the upright state.

Figure 4:
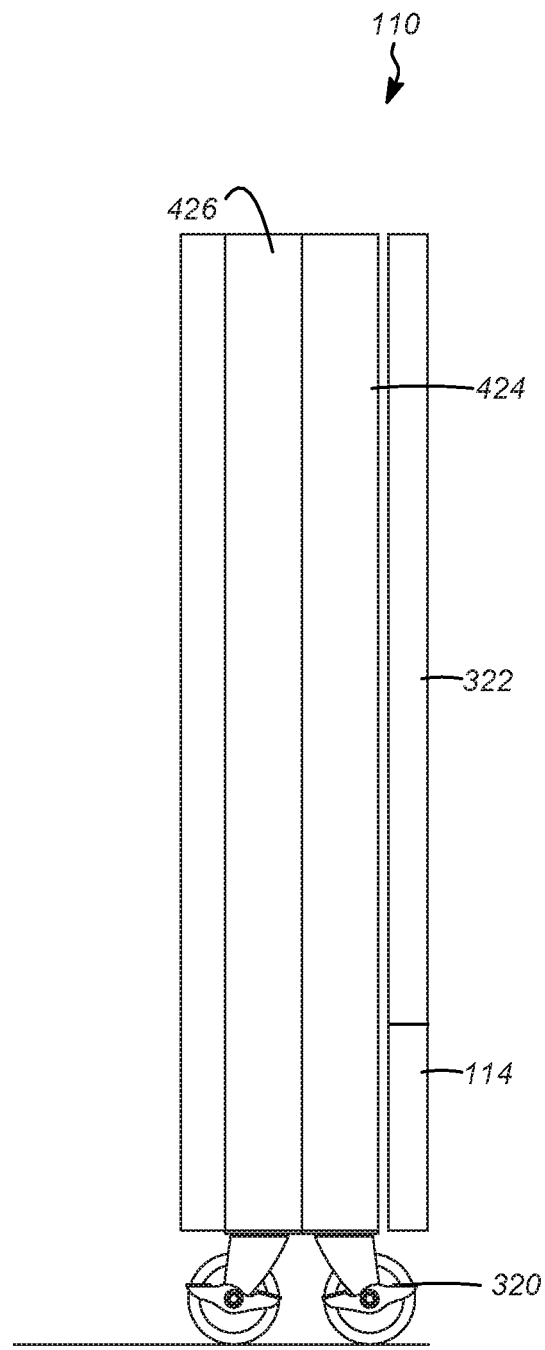
FIG. 4 is a side view of a side cart in a folded state in accordance with various embodiments herein.
Figure 5:
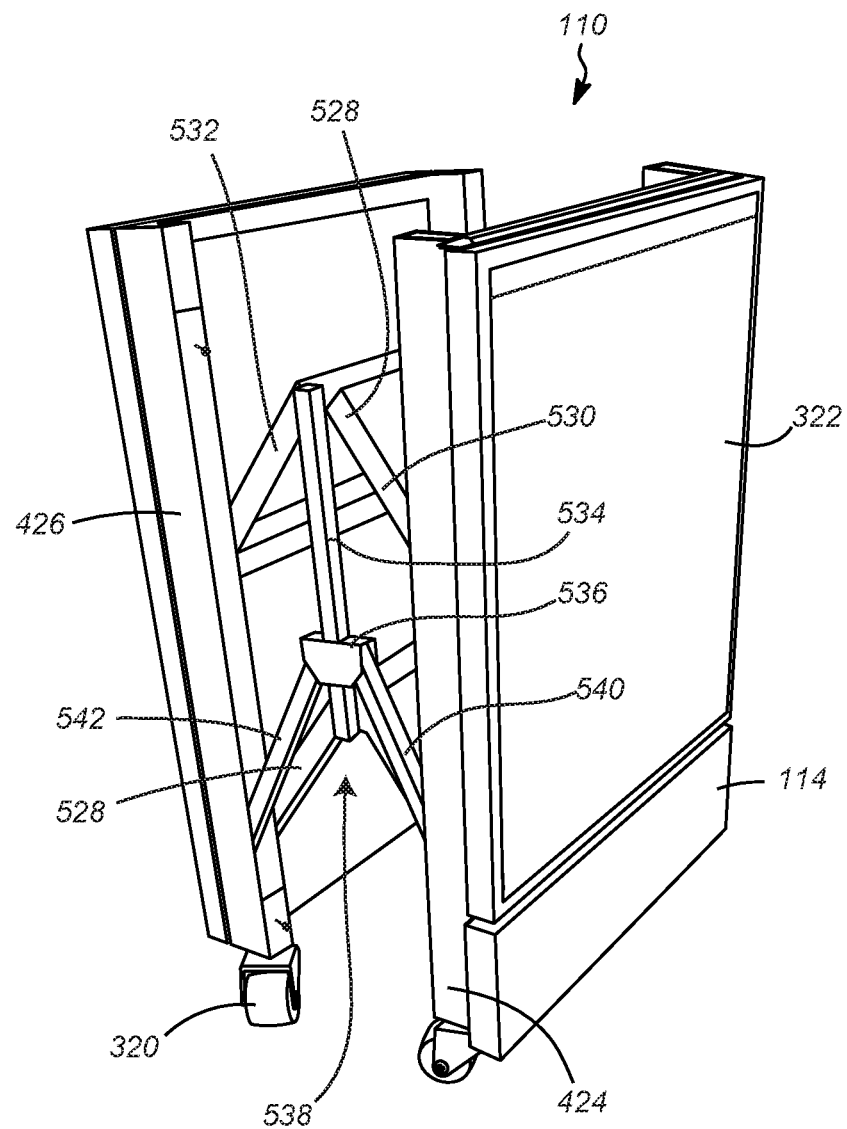
FIG. 5 is a perspective view of the side cart of FIG. 4 between a folded state and an upright state in accordance with various embodiments herein.

FIGS. 4-6 show various stages of a side cart 110 transitioning from the folded state (FIG. 4) to the upright state (FIG. 6) in accordance with various embodiments herein. In reference now to FIG. 4, a side view of a side cart 110 in a folded state is shown. The side cart 110 can include a front frame 424 and a back frame 426. In the folded configuration the front frame 424 can be adjacent to the back frame 426. In some embodiments, in the folded configuration the front frame 424 can contact or touch the back frame 426. In some embodiments, in the folded state, the front frame 424 and back frame 426 are at their minimum distance from each other. In some embodiments, in the upright state, the front frame 424 and back frame 426 are at their maximum distance from each other.

In reference now to FIG. 5, a perspective view of the side cart 110 between the folded configuration and the upright configuration is shown. In some embodiments, the side cart 110 can include one or more frames or shelves 528, such as a top frame or shelf, and a bottom frame or shelf, where the top frame or shelf is disposed above the bottom frame or shelf. In some embodiments, each frame or shelf 528 can include a front portion 530 and a back portion 532. The front portion 530 can be coupled to the back portion 532 via a hinge or other rotatable coupling, such as to allow the front portion 530 to rotate relative to the back portion 532 as the side cart 110 is transitioned between the upright state and the folded state. In various embodiments, the front portion 530 can be coupled to the front frame 424, such as via a rotatable coupling or hinge. Similarly, the back portion 532 can be coupled to the back frame 426 via a rotatable coupling or hinge. In various embodiments, the frame or shelf 528 can provide a linkage between the vertical support member 534 and the front frame 424 and/or the back frame 426. In some embodiments, a frame can include a shelf having structure extending between the sides of the frame. In some embodiments, a frame can include a portion of a shelf.

In the folded state, the front portion 530 can be substantially parallel to the back portion 532 and substantially parallel to the front frame 424 and the back frame 426 of the side cart 110. In some embodiments, "substantially" can refer to two components that are parallel, within 1 degree of parallel, within 3 degrees of parallel, within 5 degrees of parallel, within 10 degrees of parallel, or within 15 degrees of parallel. In some embodiments, when the side cart 110 is in the folded state, the first half of the bottom shelf can be substantially located in the same plane as the first half of the top shelf. Further, in the folded state, the front portion 530 and the back portion 532 can be in different planes. In contrast, in the upright state, the front portion 530 and the back portion 532 can be in the same plane, such as shown in FIG. 6. In the upright state, a top shelf can be in a different plane than the bottom shelf.

In some embodiments, the side cart 110 can include a vertical support member 534 extending between two shelves 528. In various embodiments, the side cart 110 can include a locking member 536. The locking member can be configured to lock or secure the side cart 110 in the upright state. In some embodiments, the locking member 536 can be disposed on the vertical support member 534. In some embodiments, the locking member 536 can be slidable. The locking member 536 can be configured to slide along the vertical support member 534, such as while the side cart 110 is transitioned between a folded state and an upright state.

In various embodiments, a bracket 538 can connect various components of the side cart 110, provide structural stability to the side cart 110, and facilitate the transition between the folded state and the upright state. In various embodiments, the bracket 538 can extend between the front frame 424 and the back frame 426.

In some embodiments, the bracket 538 can include the locking member 536. The bracket 538 can include the vertical support member 534 that can be connected to both the front portion 530 and the back portion 532 of each shelf 528. The connection can allow rotation of the front portion 530 and the back portion 532 with respect to each other and with respect to the vertical support member 534. The bracket 538 can also include a front arm 540 and a rear arm 542. The front arm 540 extends between the vertical support member 534 and the front frame 424. The rear arm 542 extends between the vertical support member 534 and the back frame 426. The front arm 540 and rear arm 542 are connected to the locking member 536, such that the front arm 540 and rear arm 542 can pivot with respect to the locking member 536. The front arm 540 can be rotatably coupled to the front frame 424 and the rear arm 542 can be rotatably coupled to the back frame 426. The locking member 536 can slide up and down along the vertical support member 534 as the side cart 110 is transitioning between a folded state and an upright state.

In the embodiment shown in the figures, a single bracket 538 is present on one end of the side cart 110. In other embodiments, a bracket 538 is present at both ends of the side cart 110.

The locking member 536 can move downwards, such as towards a bottom shelf or towards the bottom portion 318 of the side cart 110, as the side cart 110 is transitioned from the folded state to the upright state. In other embodiments, the locking member 536 can move upwards, such as towards a top shelf or towards the top portion 316 of the side cart 110, as the side cart 110 is transitioned from the folded state to the upright state.

FIG. 6 shows the side cart 110 in an upright state with a top cap 112 coupled to the side cart 110. In some embodiments, the arrangement shown in FIG. 6 can be locked or unlocked depending on the state of the locking member 536. In various embodiments that include two shelves 528, the top shelf can be substantially parallel with the bottom shelf when the side cart 110 is in the upright state.

Figure 7:
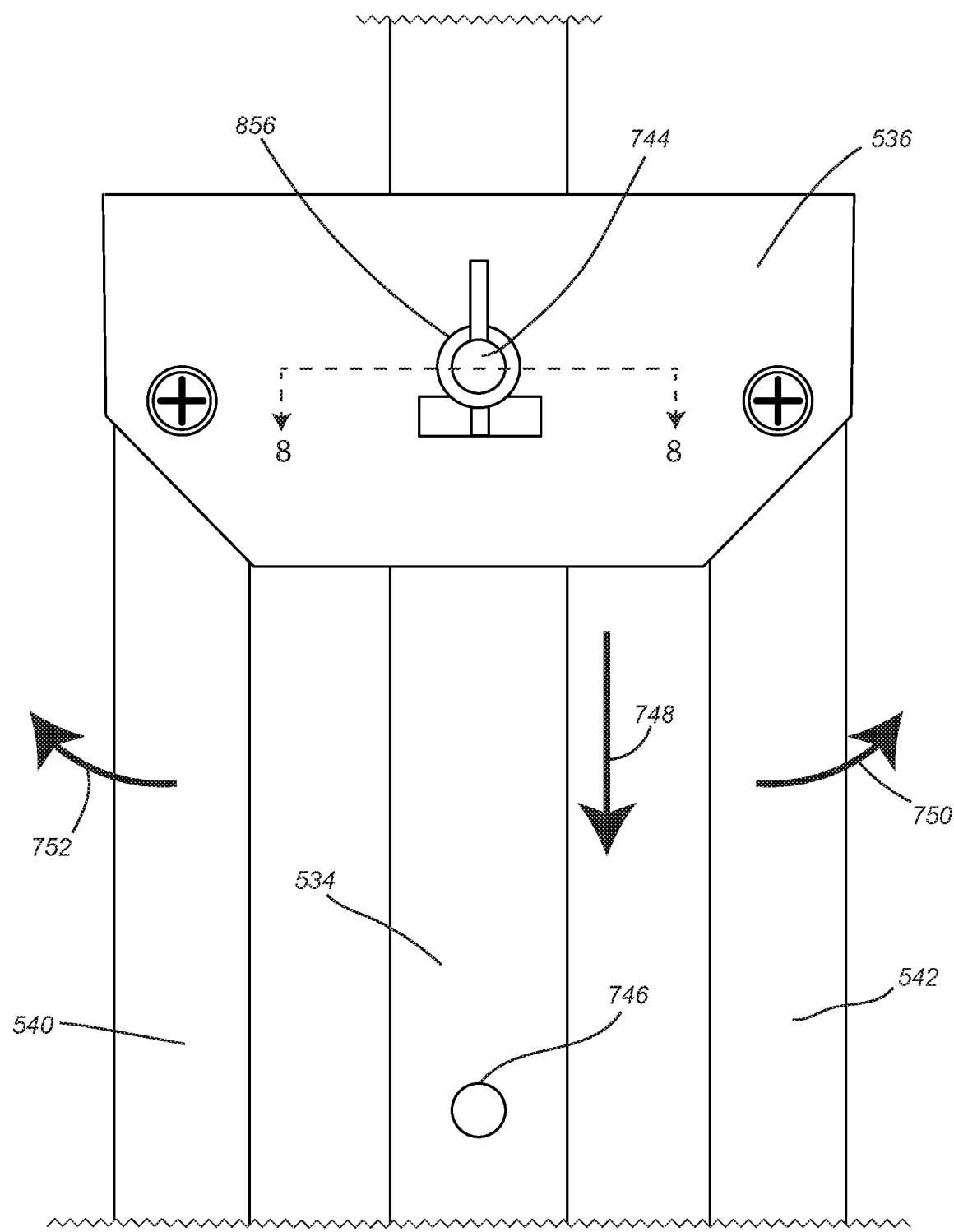
FIG. 7 is a front view of a portion of a side cart in an unlocked state in accordance with various embodiments herein.

FIGS. 7-11 show various views the locked and unlocked states. It should be understood that the figures represent general relationships between various components. Component sizes can vary between figures and embodiments. FIG. 7 is a front view of a portion of a side cart in an unlocked state in accordance with various embodiments herein. In various embodiments, the locking member 536 can include a locking pin 744. The vertical support member 534 can define a locking pin aperture 746. The locking pin aperture 746 can be configured to receive at least a portion of the locking pin 744 when the side cart 110 is locked in the upright configuration. In various embodiments, locking the side cart 110 in the upright state can include inserting at least a portion of the locking pin 744 in the locking pin aperture 746. When the locking pin 744 is at least partially disposed within the locking pin aperture 746, the locking member 536 can be restricted from sliding or translating along the vertical support member 534 thereby preventing the front frame 424 moving closer to the back frame 426 (locking the side cart in the upright state). In other embodiments, the locking member 536 can define the locking pin aperture 746 and the vertical support member 534 can include the locking pin 744.

Figure 11:
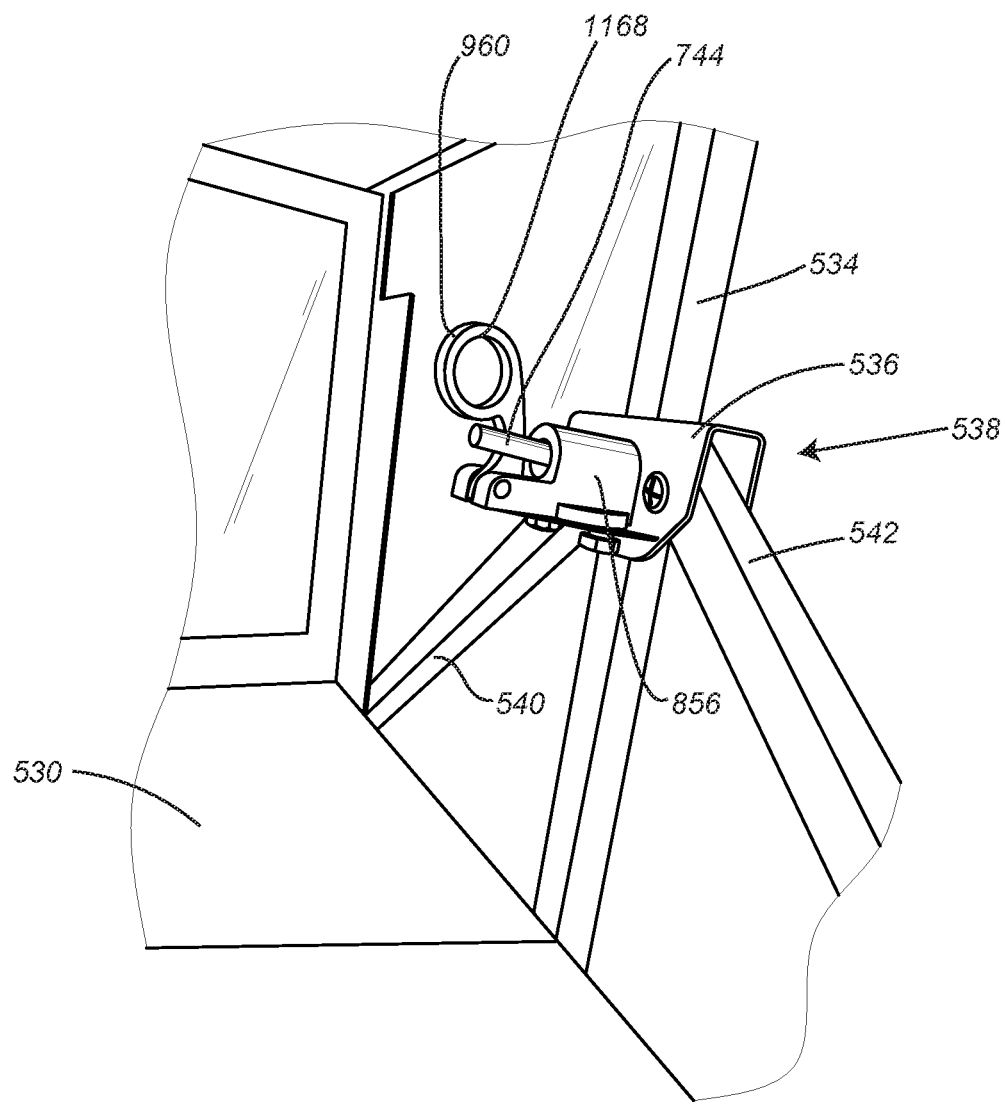
FIG. 11 is a perspective view of a locking member in a locked state in accordance with various embodiments herein.
Figure 13:
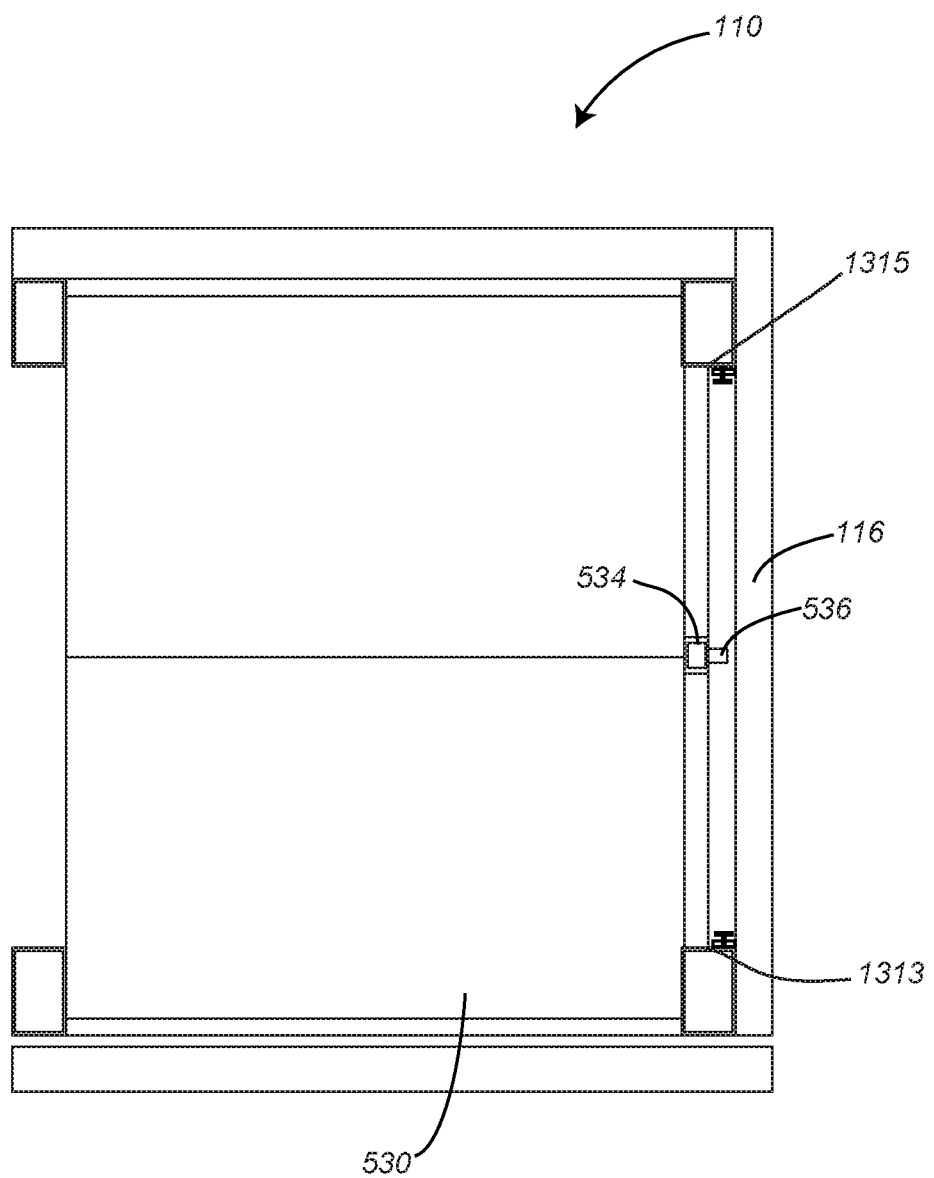
FIG. 13 is a top view of a side cart with a panel in accordance with various embodiments herein.
Figure 14:
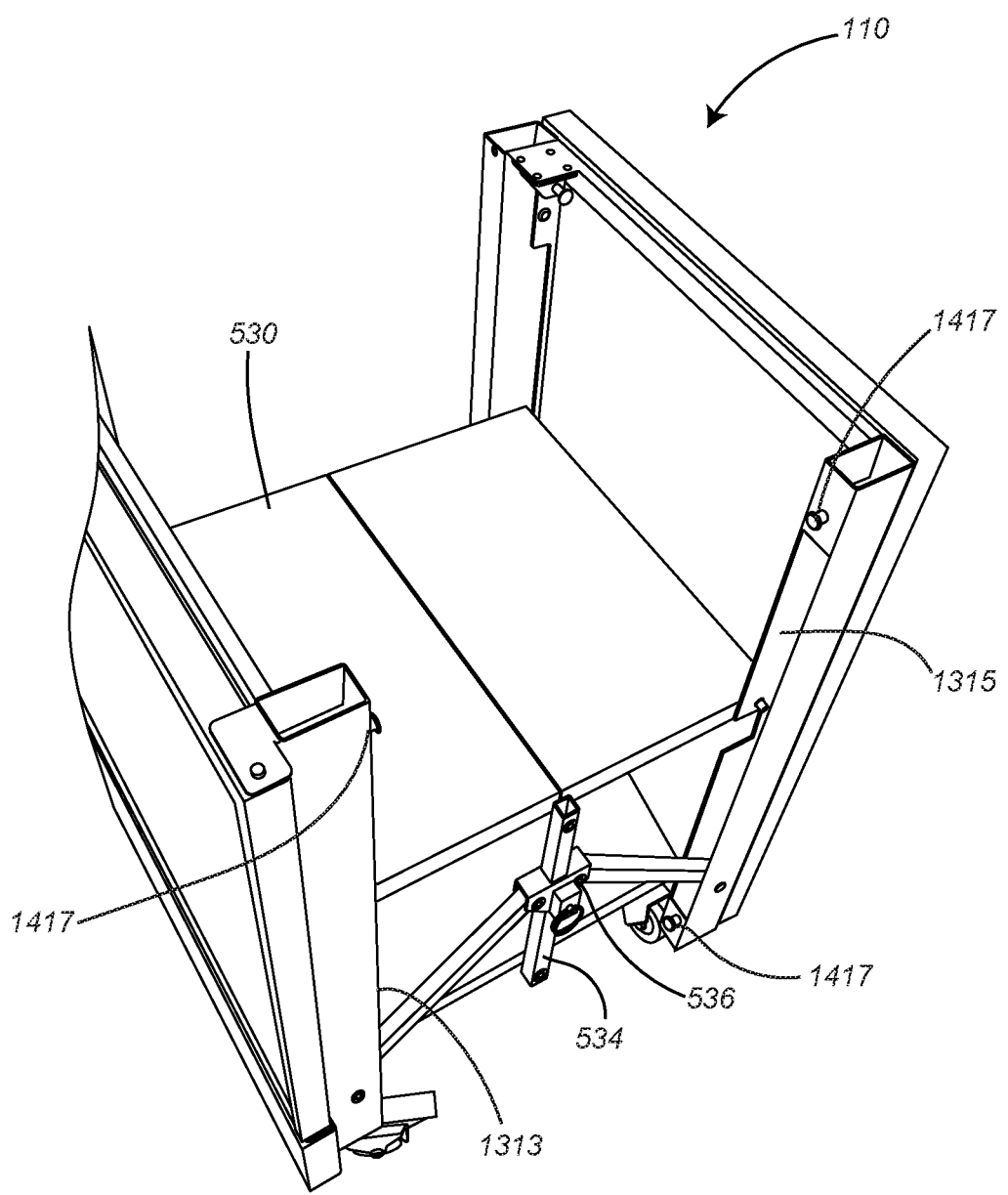
FIG. 14 is a perspective view of a side cart in a locked state in accordance with various embodiments herein.

FIGS. 5-6 and 11 show an embodiment with the locking member 536 being disposed on an interior portion of the side cart 110. FIGS. 13-14 show an embodiment with the locking member 536 disposed on an exterior portion of the side cart 110.

In various embodiments, when transitioning from the folded state to the upright state, the locking member 536 can move in the direction of arrow 748. As the locking member 536 moves in the direction of arrow 748, the front frame 424 and the back frame 426 can be forced away from each other as the front arm 540 rotates in the direction of arrow 750 and the rear arm 542 rotates in the direction of arrow 752.

Figure 8:
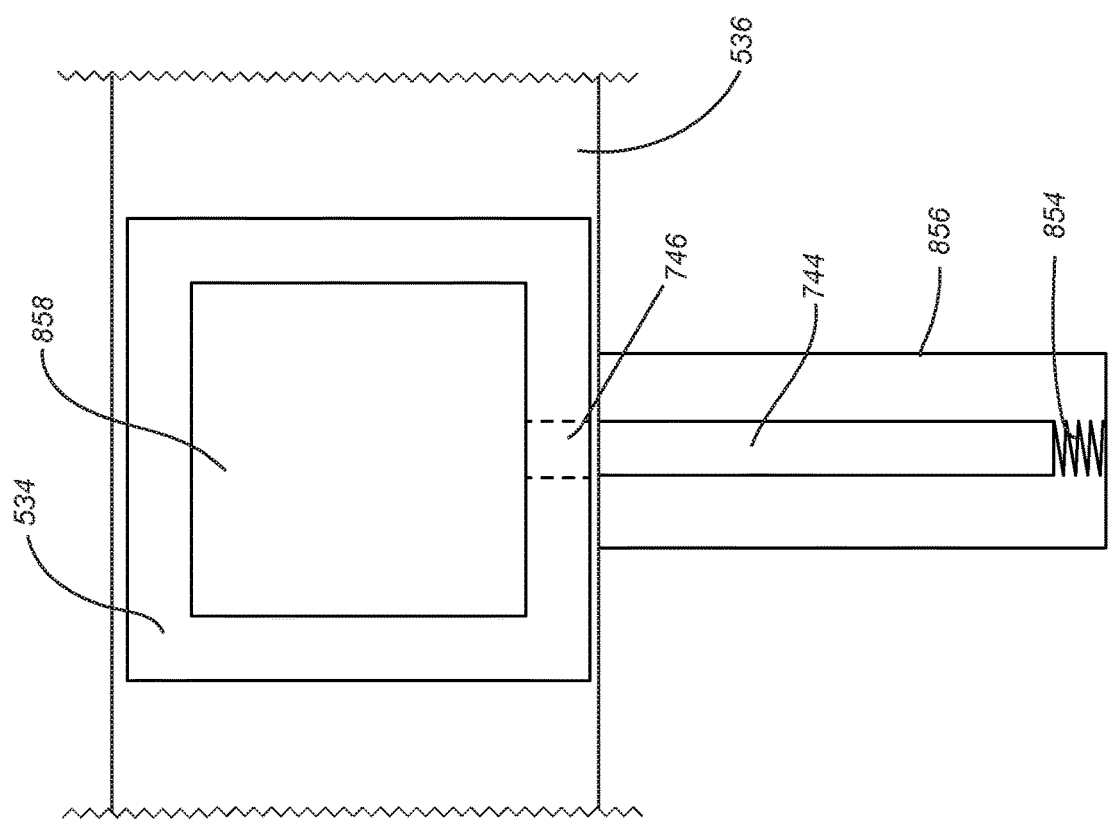
FIG. 8 is a schematic cross-sectional view of a portion of a side cart in an unlocked state, along line 8-8 of FIG. 7, in accordance with various embodiments herein.

FIG. 8 shows a schematic top cross-sectional view of a portion of a side cart in an unlocked state taken along line 8-8 in FIG. 7 in accordance with various embodiments herein. In some embodiments, the locking member 536 can include a spring 854. The spring 854 can bias the locking pin 744 into the locked position, such as to prevent the side cart 110 from being unintentionally unlocked. The locking pin 744 and the spring 854 can be disposed within a housing 856. In some embodiments, the vertical support member can define an interior space 858, such as shown in FIG. 8. In other embodiments, the vertical support member can be solid. In other embodiments, the locking pin 744 can be moved manually, such as by a user. In other embodiments, the locking pin 744 can be moved by a linkage or gear, such that when the locking pin 744 is aligned with the aperture 746 the locking pin 744 is translated or moved into the aperture 746.

In various embodiments, the locking member 536 can include a locking pin 744. In other embodiments, the locking member 536 can include a sliding pin, a snap catch, or a cotter pin.

Figure 9:
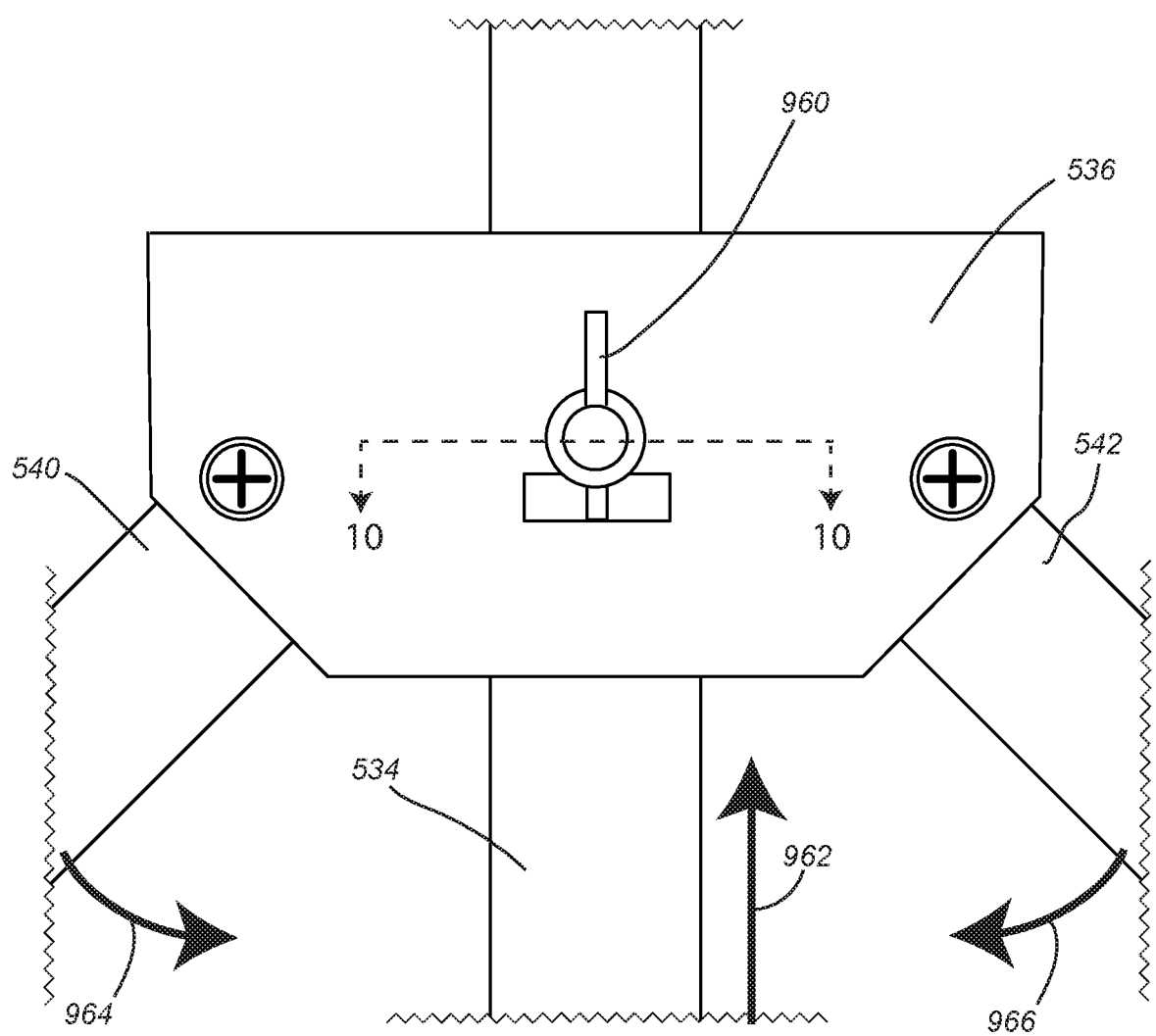
FIG. 9 is a front view of a portion of a side cart in a locked state in accordance with various embodiments herein.

FIG. 9 shows a front view of a portion of the side cart 110 in a locked state in accordance with various embodiments herein. In some embodiments, the locking pin 744 can include a loop or handle 960. FIG. 11 provides a perspective view of one example of a loop or handle 960. The loop or handle 960 can be grasped by a user and pulled against the spring force of spring 854 to remove the locking pin 744 from the locking pin aperture 746, such as to transition the side cart 110 from the upright state to the folded state.

To transition the side cart 110 from the upright state to the folded state, the locking pin 744 can be removed from within the locking pin aperture 746. The locking member 536 can move along the vertical support member 534 in the direction of arrow 962. As the locking member 536 moves along the vertical support member 534, the front arm 540 can move in the direction of arrow 964 and the rear arm 542 can move in the direction of arrow 966, which can result in pulling the front frame 424 and the back frame 426 towards each other until the side cart 110 is in the folded state.

Figure 10:
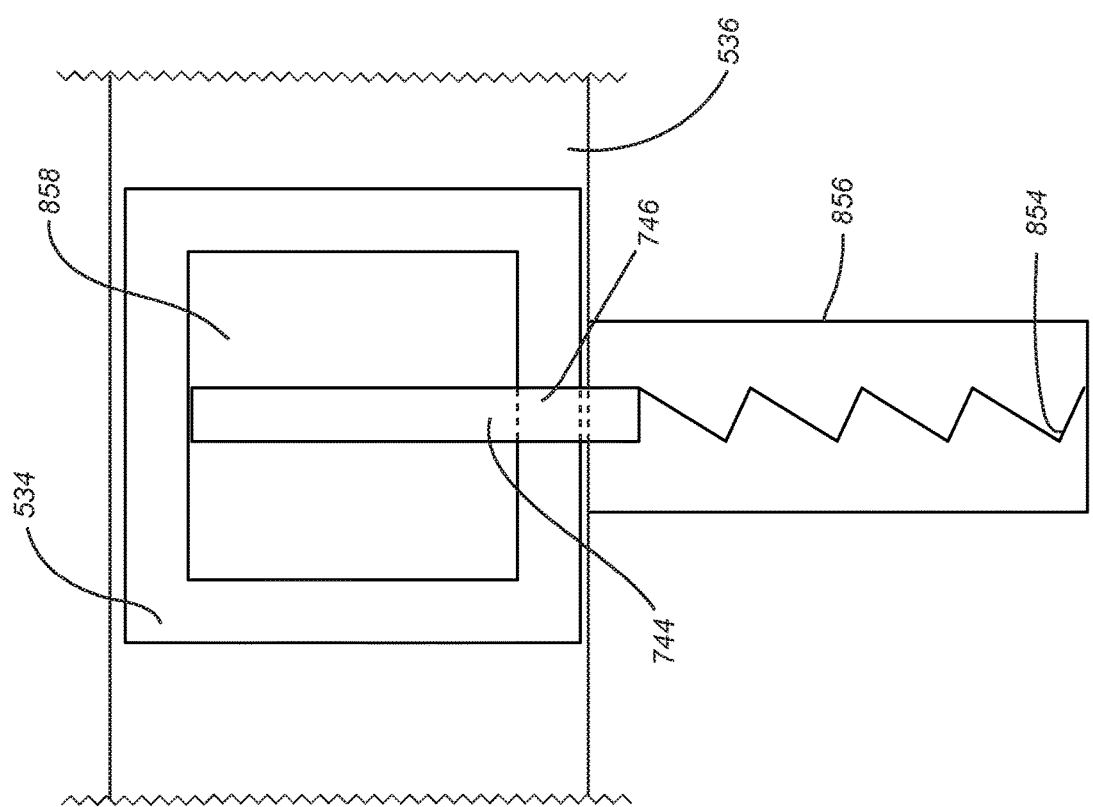
FIG. 10 is a schematic cross-sectional view of a portion of a side cart in a locked state, along line 10-10 of FIG. 9, in accordance with various embodiments herein.

FIG. 10 shows a schematic top cross-sectional view of a portion of a side cart in a locked state taken along line 10-10 in FIG. 9 in accordance with various embodiments herein. In some embodiments, the locking pin 744 can be biased into the locked position, or the extended position, by the spring 854. In some embodiments, in the locked state, at least a portion of the locking pin 744 can be disposed within the vertical support member 534 and at least a portion of the locking pin 744 can be disposed outside of the vertical support member 534, such that the locking pin 744 will contact the portion of the vertical support member 534 that defines the locking pin aperture 746. The locking pin 744 contacting the portion of the vertical support member 534 can prevent the locking member 536 from moving relative to the vertical support member 534. As such, the front frame 424 and the back frame 426 will be prevented from moving towards each other, and the side cart 110 will remain in the upright state.

FIG. 11 shows a perspective view of the locking member 536 in a locked state in accordance with various embodiments herein. In some embodiments the handle 960 can define an aperture 1168 which can be grasped by a user to remove the locking pin 744 from the locking pin aperture 746.

Figure 12:
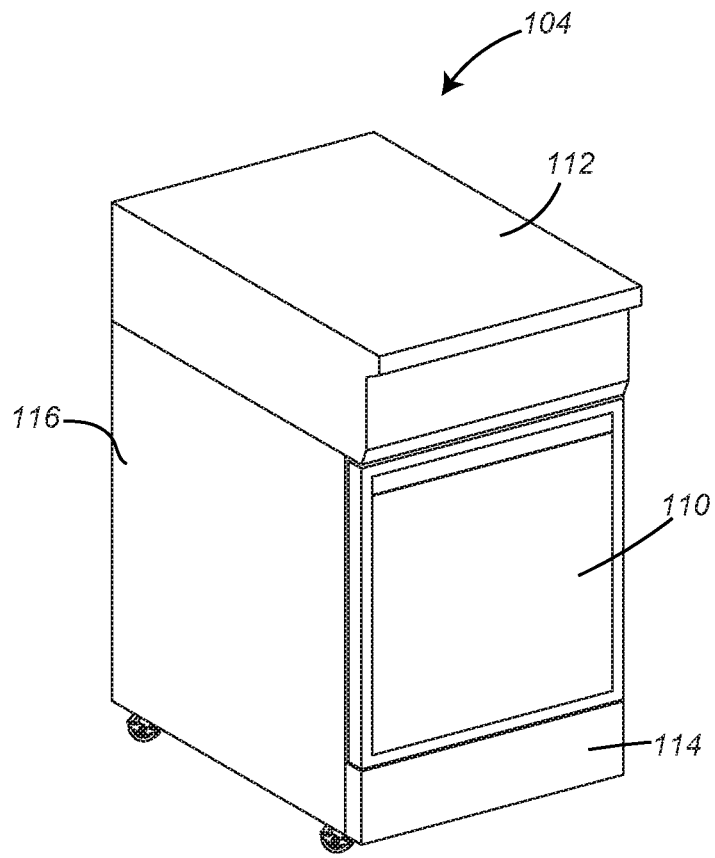
FIG. 12 is a perspective view of a side assembly in accordance with various embodiments herein.

FIG. 12 is a perspective view of a side assembly 104 in accordance with various embodiments herein. In some embodiments, the side assembly 104 can include a panel 116. The panel 116 can enclose one side of the side cart 110. In some embodiments, the locking member 536 can be located on an exterior side of the side cart 110, such as shown in FIGS. 13 and 14. The locking member 536 can be disposed between a portion of the side cart 110 and the panel 116. In the embodiment of FIG. 13, the panel 116 in its installed location on the side cart 110 prevents the locking member 536 from transitioning to an unlocked position.

FIG. 14 shows a perspective side view of the locking member 536 on the exterior portion of the side cart 110. In reference now to FIG. 13, a cross-sectional top view of a side cart 110 with a panel 116 is shown in accordance with various embodiments herein. In some embodiments, the side cart 110 can be transitioned into the locked upright state and then a panel 116 can be coupled to the side cart 110. The panel 116 can interfere with or block the locking pin 744, so that the locking pin 744 is prevented from moving towards the unlocked position when the panel 116 is present on the side cart.

In some embodiments, the locking member 536 can provide a primary locking function of locking the side cart 110 into the upright state. In some embodiments, the panel 116 can provide a secondary locking function of locking the side cart 110 into the upright state. In some embodiments, the panel 116 can provide the secondary locking function to the side cart 110 and prevent the locking member 536 from unlocking by interfering with the locking pin 744 moving to an unlocked position. The panel 116 can block user access to the locking member 536, and, as a result, interfere with the function of the locking member by preventing the locking member 536 from being accessed by a user. This is illustrated in FIG. 13.

In various embodiments, the panel 116 can be at least partially disposed between a front frame portion 1313 of the side cart 110 and a back frame portion 1315 of the side cart 110. In some embodiments, the panel 116 can include a bracket that defines an aperture. The bracket can be disposed between the front frame portion 1313 and the back frame portion 1315. In various embodiments, the front frame portion 1313 and back frame portion 1315 can include one or more panel connection projections 1417. The aperture in the bracket on the panel 116 can be configured to receive a panel connection projection 1417, such as to couple the panel to the side cart 110.

As a result of the position of panel 116 and its attachment to the front frame portion 1313 and the back frame portion 1315, the panel 116 provides a secondary locking function to the side cart 110 because the front frame portion 1313 is prevented from moving closer to the back frame portion 1315 by the presence of the panel 116. This relationship is illustrated in FIG. 13. FIG. 13 shows locking member 536 on an outside surface of vertical support member 534. This secondary locking function of the panel 116 is also present in embodiments where the locking member 536 is present on an inside surface of the vertical member 534, as shown in FIG. 11.

Methods

Figure 15:
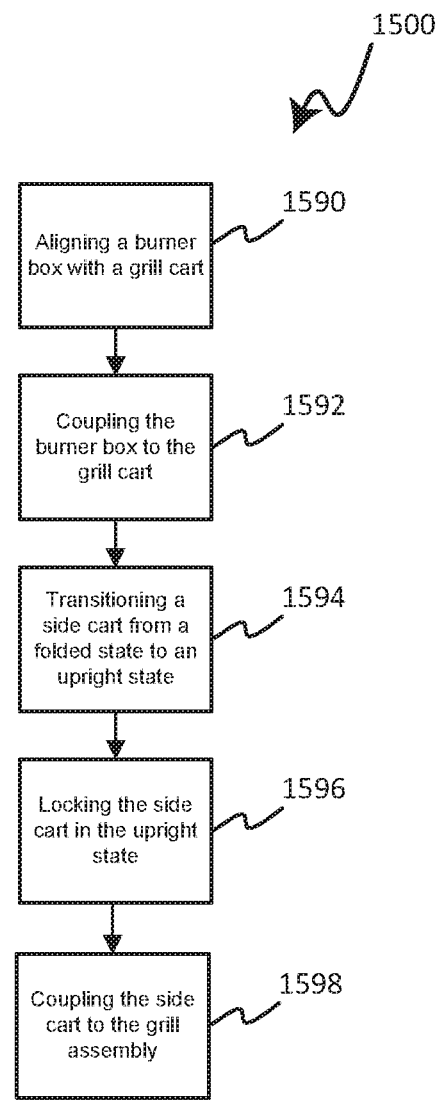
FIG. 15 is a flow chart depicting a method in accordance with various embodiments herein.

FIG. 15 shows a flowchart depicting a method 1500 of assembling a grill system in accordance with various embodiments herein. In various embodiments, the method 1500 can include aligning a burner box with a top portion of a grill cart, step 1590. In various embodiments, the method 1500 can include coupling the burner box to the grill cart to form a grill assembly, step 1592. In various embodiments, the method 1500 can include transitioning a side cart from a folded state to an upright state, step 1594.

In various embodiments, the method 1500 can include locking the side cart into the upright state, step 1596. In some embodiments, locking the side cart into the upright state can include inserting a locking pin into a locking pin aperture. In some embodiments, the spring can be bias the locking pin into the locked or extended position. In some embodiments, the locking pin can automatically enter the locking pin aperture when the locking pin is aligned with the locking pin aperture, such as when the spring biases the locking pin into the locked or extended position. In various embodiments, the method 1500 can include coupling the side cart to the grill assembly, step 1598. In some embodiments, steps 1594 and 1596 related to forming the side assembly can take place before steps 1590 and 1592 related to forming the grill assembly.

In some embodiments, the method 1500 can additionally include unlocking the side cart from the upright state, such as by removing the locking pin from the locking pin aperture. In various embodiments, removing the locking pin from the locking pin aperture can include overcoming the spring force generated by the spring, such as to overcome the bias of the locking pin into the locked or extended position. In some embodiments, the method 1500 can further include transitioning the side cart into the folded state, such as from an upright state and after the locking pin has been removed from the locking pin aperture.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A grill system, comprising:
   a grill assembly comprising a grill cart and a burner box coupled to a top portion of the grill cart; and
   a side assembly coupled to the grill assembly, the side assembly comprising a side cart; the side cart comprises:
   a front frame;
   a back frame;

a bottom frame comprising a first half and a second half, the first half being rotatably couple to the second half;
a top frame comprising a first half and a second half, the first half being rotatably coupled to the second half;
a vertical support member extending between the top frame and the bottom frame; and
a slidable locking member disposed on the vertical support member;
wherein the side cart is transitionable between a folded state and an upright state, the side cart defines an interior volume; wherein the interior volume is greater when the side cart is in the upright state than when the side cart is in the folded state;
wherein the first half of the bottom frame is rotatably coupled to the front frame and the second half of the bottom frame is rotatably coupled to the back frame;
wherein the first half of the top frame is rotatably coupled to the front frame and the second half of the top frame is rotatably coupled to the back frame; wherein the top frame is disposed above the bottom frame;
wherein the slidable locking member is configured to slide along the vertical support member when the side cart is transitioned between the folded state and the upright state; the slidable locking member is further configured to lock the side cart into the upright state;
wherein when the side cart is in the folded state, the first half of the bottom frame is located in the same plane as the first half of the top frame.

2. The grill system of claim 1, wherein the top frame is substantially parallel with the bottom frame when the side cart is in the upright state.

3. The grill system of claim 1, wherein the slidable locking member comprises a locking pin, and the vertical support member defines at least one locking pin aperture configured to receive a portion of the locking pin when the side cart is in an upright state to lock the side cart in the upright state and prevent the side cart from transitioning into the folded state.

4. The grill system of claim 3, wherein the locking pin is spring biased into a locked state.

5. The grill system of claim 1, wherein the front frame comprises a door or a drawer.

6. The grill system of claim 1, wherein the side cart further comprises a first arm extending from the front frame to the slidable locking member and a second arm extending from the back frame to the slidable locking member;
wherein the slidable locking member is configured to move towards the bottom frame as the side cart is transitioned from the folded state to the upright state.

7. The grill system of claim 1, wherein the side cart further comprises a first arm extending from the front frame to the slidable locking member and a second arm extending from the back frame to the slidable locking member;
wherein the slidable locking member is configured to move towards the top frame as the side cart is transitioned from the folded state to the upright state.

8. A grill system, comprising:
a grill assembly comprising a grill cart and a burner box coupled to a top portion of the grill cart; and
a side assembly coupled to the grill assembly, the side assembly comprising a side cart; the side cart comprises:
a front frame;
a back frame;
a bottom frame comprising a first half and a second half, the first half being rotatably couple to the second half;
a top frame comprising a first half and a second half, the first half being rotatably coupled to the second half;
a vertical support member extending between the top frame and the bottom frame; and
a slidable locking member disposed on the vertical support member;
wherein the side cart is transitionable between a folded state and an upright state, the side cart defines an interior volume; wherein the interior volume is greater when the side cart is in the upright state than when the side cart is in the folded state;
wherein the first half of the bottom frame is rotatably coupled to the front frame and the second half of the bottom frame is rotatably coupled to the back frame;
wherein the first half of the top frame is rotatably coupled to the front frame and the second half of the top frame is rotatably coupled to the back frame; wherein the top frame is disposed above the bottom frame;
wherein the slidable locking member is configured to slide along the vertical support member when the side cart is transitioned between the folded state and the upright state; the slidable locking member is further configured to lock the side cart into the upright state;
wherein the slidable locking member comprises a locking pin, and the vertical support member defines at least one locking pin aperture configured to receive a portion of the locking pin when the side cart is in an upright state to prevent the side cart from transitioning into the folded state;
wherein the side cart further comprises a first arm extending from the front frame to the slidable locking member and a second arm extending from the back frame to the slidable locking member;
wherein when the side cart is in the folded state, the first half of the bottom frame is located in the same plane as the first half of the top frame.

9. The grill system of claim 8, wherein the locking pin is spring biased into a locked state.

10. A grill system, comprising:
a grill assembly comprising a grill cart and a burner box coupled to a top portion of the grill cart; and
a side assembly coupled to the grill assembly, the side assembly comprising a side cart, the side cart comprises:
a slidable locking member disposed on a vertical support member; and
a panel disposed between a front frame and a back frame in the upright state;
wherein the side cart is transitionable between a folded state and an upright state, the side cart defines an interior volume; wherein the interior volume is greater when the side cart is in the upright state than when the side cart is in the folded state;
wherein the slidable locking member is configured to slide along the vertical support member when the side cart is transitioned between the folded state and the upright state; the slidable locking member is further configured to lock the side cart into the upright state;
wherein the slidable locking member comprises a locking pin, and the vertical support member defines at least one locking pin aperture configured to receive a portion of the locking pin when the side cart is in an upright state to prevent the side cart from transitioning into the folded state;

wherein the panel is configured to provide a secondary locking function to the side cart in the upright state by interfering with the locking pin when the locking pin attempts to withdraw from the locking pin aperture.

11. The grill system of claim 10, wherein the panel provides the secondary locking function to the side cart in the upright state by preventing the front frame and the back frame from moving toward each other when the panel is attached to the side assembly.

12. A method of assembling a grill system, comprising:
assembling a grill assembly comprising:
  aligning a burner box with a top portion of a grill cart;
  coupling the burner box to the grill cart to form the grill assembly;
assembling a side cart comprising:
  transitioning a side cart from a folded state to an upright state;
  locking the side cart into the upright state; and
coupling the side cart to the grill assembly;
wherein the side cart comprises: a front frame, a back frame, a bottom frame; a top frame, a vertical support member extending from the bottom frame to the top frame, and a slidable locking member disposed on the vertical support member, the side cart defines an interior volume; wherein the interior volume is greater when the side cart is in the upright state than when the side cart is in the folded state;
wherein the bottom frame comprises a first half and a second half, the first half is rotatably coupled to the second half;
wherein the top frame comprises a first half and a second half, the first half is rotatably coupled to the second half;
wherein the first of half of the bottom frame is rotatably coupled to the front frame and the second half of the bottom frame is rotatably coupled to the back frame;
wherein the first half of the top frame is rotatably coupled to the front frame and the second half of the top frame is rotatably coupled to the back frame; wherein the top frame is disposed above the bottom frame;
wherein when the side cart is in the folded state, the first half of the bottom frame is located in the same plane as the first half of the top frame;
wherein the slidable locking member is configured to slide along the vertical support member when the side cart is transitioned between the folded state and the upright state; the slidable locking member is further configured to lock the side cart into the upright state.

13. The method of assembling a grill system of claim 12, wherein the slidable locking member comprises a locking pin and the vertical support member defines a locking pin aperture.

14. The method of assembling a grill system of claim 13, wherein locking the side cart in the upright state comprises inserting the locking pin into the locking pin aperture.

15. The method of assembling a grill system of claim 14, further comprising:
unlocking the side cart from the upright state by removing the locking pin from the locking pin aperture.

16. The method of assembling a grill system of claim 15, further comprising:
transitioning the side cart into the folded state.

17. The method of assembling a grill system of claim 12, wherein the side cart further comprises a first arm extending from the front frame to the slidable locking member and a second arm extending from the back frame to the slidable locking member;
wherein the slidable locking member is configured to move towards the bottom frame as the side cart is transitioned from the folded state to the upright state.

18. The method of assembling a grill system of claim 12, wherein the side cart further comprises a first arm extending from the front frame to the slidable locking member and a second arm extending from the back frame to the slidable locking member;
wherein the slidable locking member is configured to move towards the top frame as the side cart is transitioned from the folded state to the upright state.

\* \* \* \* \*